US012681783B1

(12) United States Patent
Anderson et al.

(10) Patent No.:    US 12,681,783 B1
(45) Date of Patent:        Jul. 14, 2026

(54) APPROXIMATE DUPLICATE EVENT FILTER

(71) Applicant: Amazon Technologies, Inc., Seattle, WA (US)

(72) Inventors: Karl Eric Anderson, Columbia, MD (US); Kelly Anne Rooker, Ellicott City, MD (US); Nebi Mert Aydin, Odenton, MD (US); Joshua Kupershmidt, Somerville, MA (US); Menachem Mendel Lerner, Baltimore, MD (US); Samuel Macaluso, Arlington, VA (US); Jacob A. Niebloom, Baltimore, MD (US); Martin C Stonebraker, Sparks, MD (US); Aditya Tiwari, Woburn, MA (US)

(73) Assignee: Amazon Technologies, Inc., Seattle, WA (US)

( * ) Notice: Subject to any disclaimer, the term of this patent is extended or adjusted under 35 U.S.C. 154(b) by 411 days.

(21) Appl. No.: 18/538,929

(22) Filed: Dec. 13, 2023

(51) Int. Cl.
| | |
|---|---|
| *G06F 9/54* | (2006.01) |
| *G06F 12/0864* | (2016.01) |
| *G06F 40/284* | (2020.01) |

(52) U.S. Cl.
CPC .......... *G06F 9/542* (2013.01); *G06F 12/0864* (2013.01); *G06F 40/284* (2020.01)

(58) Field of Classification Search
CPC ..... G06F 9/542; G06F 12/0864; G06F 40/284
See application file for complete search history.

(56) References Cited

U.S. PATENT DOCUMENTS

| | | | |
|---|---|---|---|
| 7,979,670 B2 | 7/2011 | Saliba et al. | |
| 8,793,191 B2 | 7/2014 | Abernethy et al. | |
| 9,092,447 B1 | 7/2015 | Anderson et al. | |
| 9,245,007 B2 | 1/2016 | Joshi et al. | |
| 9,275,143 B2 | 3/2016 | Pugh et al. | |
| 9,634,920 B1 | 4/2017 | Goldberg et al. | |
| 9,661,074 B2 | 5/2017 | Peake | |
| 10,180,953 B2 | 1/2019 | Sorenson, III et al. | |
| 10,993,277 B2 | 4/2021 | Xu et al. | |
| 11,350,260 B2 | 5/2022 | Xu et al. | |
| 2020/0028926 A1* | 1/2020 | Sprague | H04L 9/0877 |
| 2021/0042742 A1* | 2/2021 | McHugh | G06Q 30/0185 |
| 2023/0153226 A1* | 5/2023 | Garg | G06F 11/3624 |
| | | | 717/128 |

OTHER PUBLICATIONS

U.S. Appl. No. 17/936,787, filed Sep. 29, 2002, Karl Eric Anderson, et al.

* cited by examiner

*Primary Examiner* — Sisley N Kim
(74) *Attorney, Agent, or Firm* — Alexander A. Knapp; Kowert, Hood, Munyon, Rankin & Goetzel, P.C.

(57)        ABSTRACT

Methods and systems of using an approximate duplicate event filter are disclosed. Event processing systems of a service provider network such as a security service may receive a large volume of events to analyze. Events that have previously occurred can be given a lower priority for analysis than new events. Events that are similar to previous events can likely also be given a lower priority for analysis. These non-exact match events can be detected by comparing token representations of new events to token representations of previous events. Events may be considered according to the context in which the events occur.

20 Claims, 9 Drawing Sheets

Provider Network Computing Resources 100

Event Analysis Service 102

Approximate Duplicate Event Filter 104

Possible New Event Identifier 106

Token Representation Generator 108

Approximate Duplicate Evaluator 110

Possible New Event Reporter 114

State of Event History Cache 112

State of Event History Updater 116

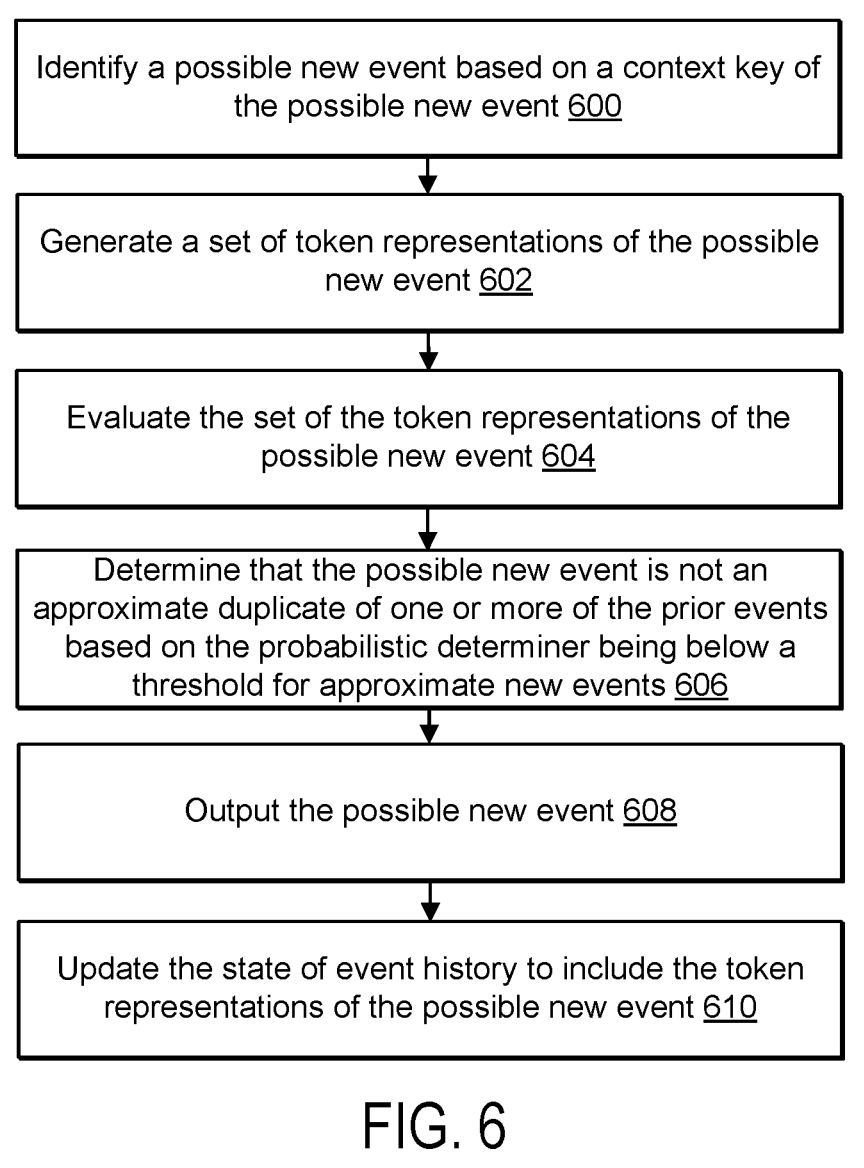

Identify a possible new event based on a context key of the possible new event 600

↓

Generate a set of token representations of the possible new event 602

↓

Evaluate the set of the token representations of the possible new event 604

↓

Determine that the possible new event is not an approximate duplicate of one or more of the prior events based on the probabilistic determiner being below a threshold for approximate new events 606

↓

Output the possible new event 608

↓

Update the state of event history to include the token representations of the possible new event 610

FIG. 6

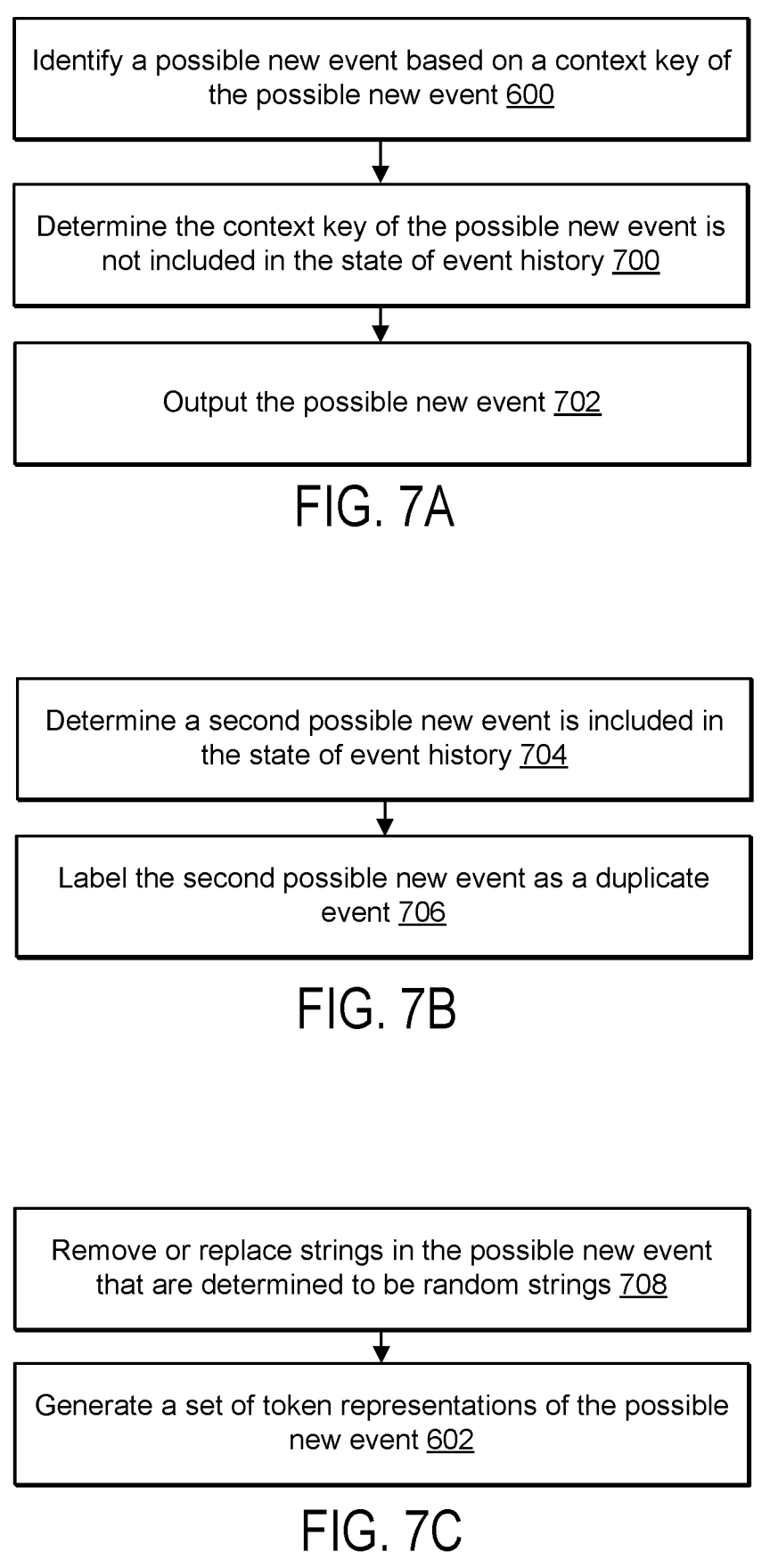

Identify a possible new event based on a context key of the possible new event 600

↓

Determine the context key of the possible new event is not included in the state of event history 700

↓

Output the possible new event 702

FIG. 7A

Determine a second possible new event is included in the state of event history 704

↓

Label the second possible new event as a duplicate event 706

FIG. 7B

Remove or replace strings in the possible new event that are determined to be random strings 708

↓

Generate a set of token representations of the possible new event 602

FIG. 7C

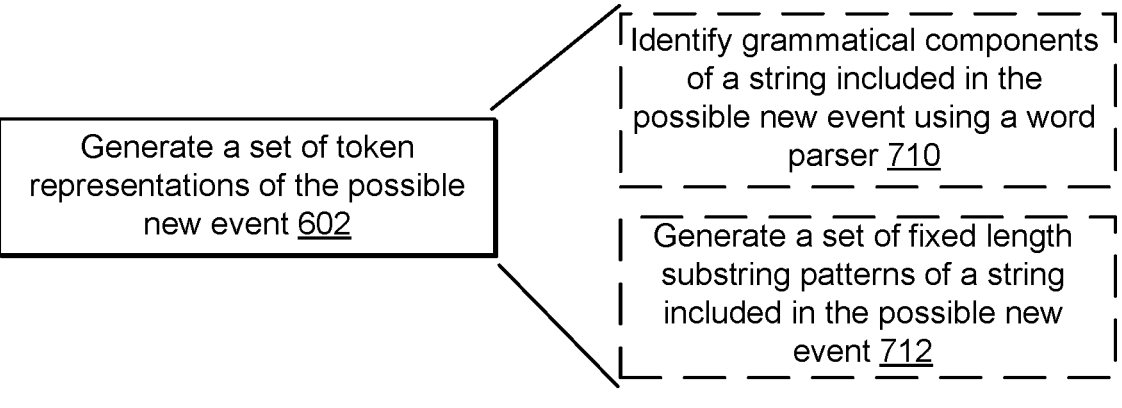

Generate a set of token representations of the possible new event 602

Identify grammatical components of a string included in the possible new event using a word parser 710

Generate a set of fixed length substring patterns of a string included in the possible new event 712

FIG. 7D

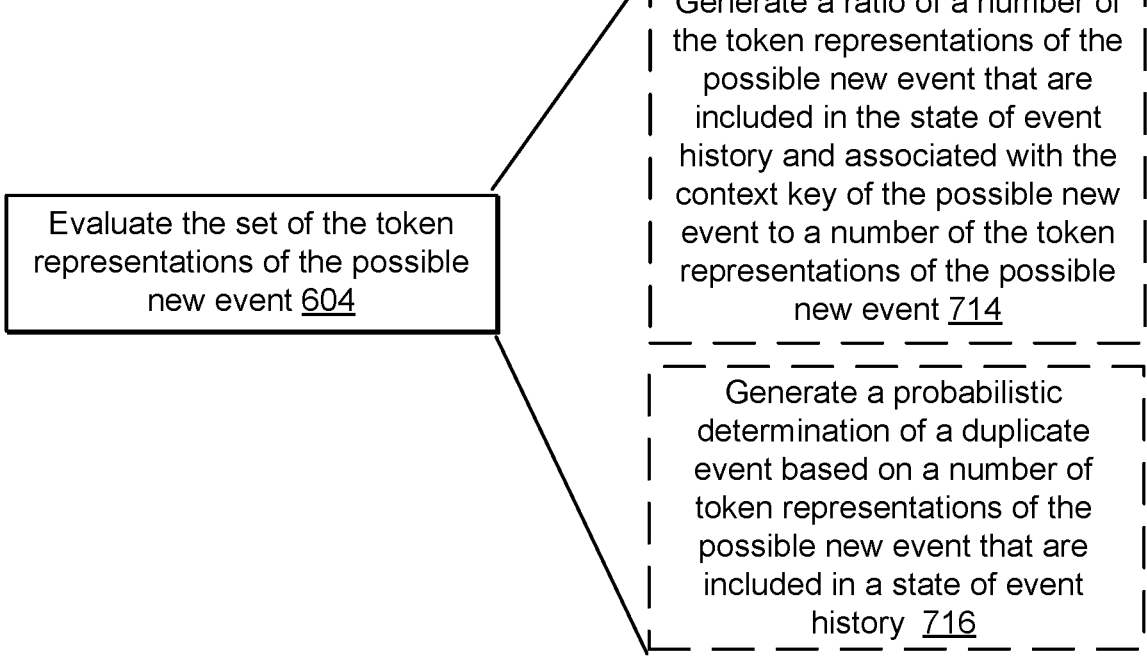

Evaluate the set of the token representations of the possible new event 604

Generate a ratio of a number of the token representations of the possible new event that are included in the state of event history and associated with the context key of the possible new event to a number of the token representations of the possible new event 714

Generate a probabilistic determination of a duplicate event based on a number of token representations of the possible new event that are included in a state of event history 716

FIG. 7E

APPROXIMATE DUPLICATE EVENT FILTER

BACKGROUND

An event analysis service may receive a large amount of events to analyze. Events that have previously been analyzed may have a lower priority than new events, and events that are similar to previously analyzed events may also have a lower priority than new events. Approximate duplicate events may be more difficult to identify than exact duplicate events because they differ from stored previous events and cannot be identified by directly searching stored previous events. Incorrectly identifying approximate duplicate events may cause an event processing service to use more resources than is necessary analyzing the approximate duplicate events and may interfere with the event analysis service's ability to timely process correctly identified new events.

BRIEF DESCRIPTION OF THE DRAWINGS

FIG. 6 is a flowchart illustrating a method of using an approximate duplicate event filter, according to some embodiments.

FIG. 7A is a flowchart illustrating a method of using a context key to skip analysis by an approximate duplicate event filter, according to some embodiments.

FIG. 7B is a flowchart illustrating a method of identifying an exact duplicate event to skip analysis by an approximate duplicate event filter, according to some embodiments.

FIG. 7C is a flowchart illustrating a method of avoiding known sources of randomness while using an approximate duplicate event filter, according to some embodiments.

FIG. 7D is a flowchart illustrating methods of generating a set of token representations of a possible new event, according to some embodiments.

FIG. 7E is a flowchart illustrating methods of evaluating the set of token representations of the possible new event, according to some embodiments.

Figure 1:
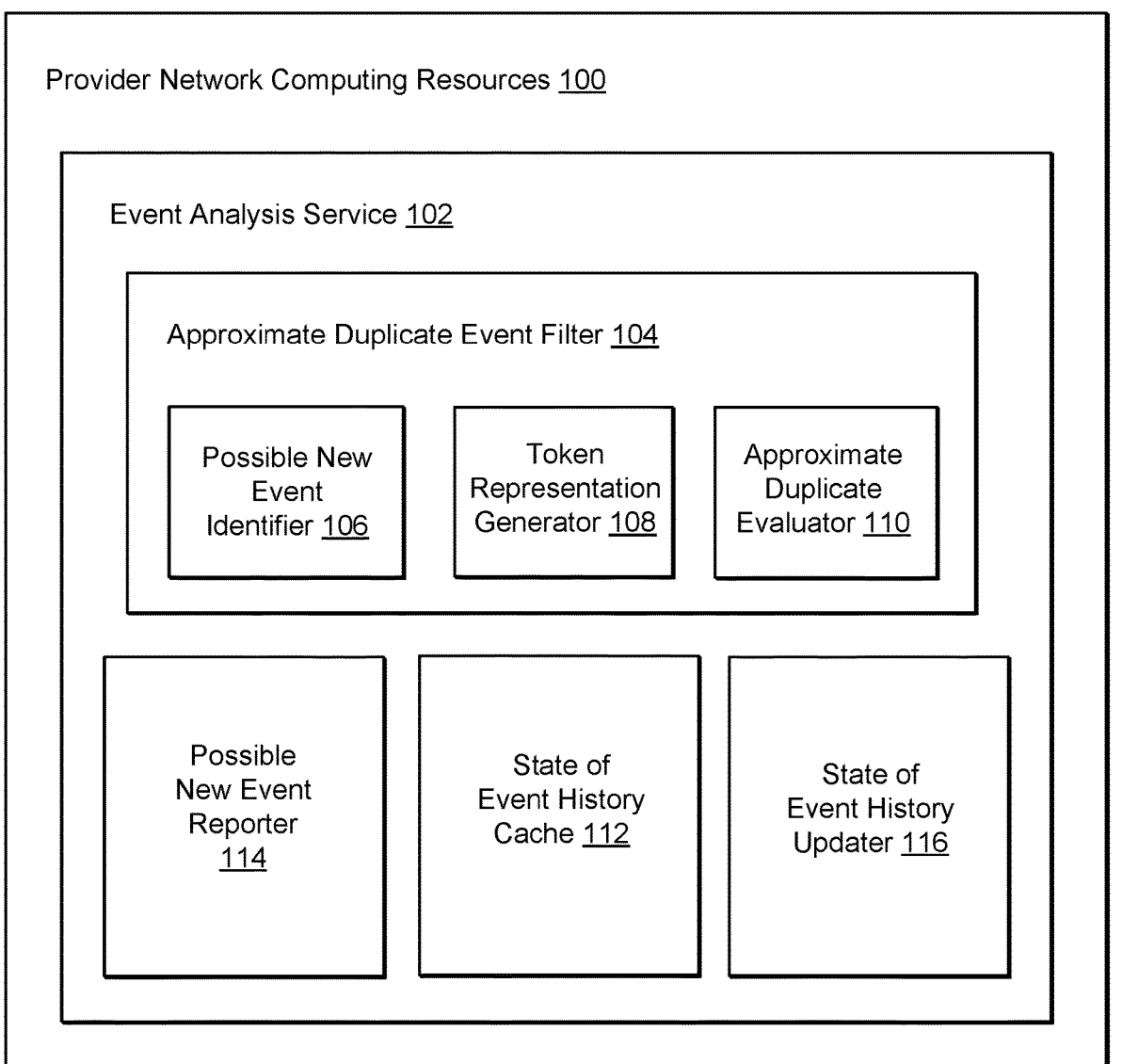
FIG. 1 is a block diagram illustrating example components of an approximate duplicate event filter, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION

Methods and systems for implementing an approximate duplicate event filter are described. An event analysis service, such as a service used for security or for social media, may receive a large amount of events, for example a continuous stream of events, to analyze and may sort the received events by priority based on the type of event. Correctly assigning priority protects the event analysis service's resources and makes it more likely that important events are given an appropriate amount of consideration. Notifications for events that have already occurred and have already been analyzed may be treated as duplicate events, and events that are similar but not exactly the same are likely to be similar in nature to the prior events that have been analyzed. These traits need to be identified so the events can be assigned the correct priority.

For example, in a security system using an event analysis service to monitor for hazardous or malicious events, regularly occurring events may not be analyzed in the same way as a new event. Consider, as an example, a situation wherein several users use a machine learning model training service protected by the security system. If one user regularly requests updates of a machine learning model, those update requests may be considered duplicate events (or near duplicate events) that do not require much scrutiny, even if the requests are not all precisely identical, possibly due to a change in timing of the update request or a slight change in parameters. This type of change may be insubstantial, and the subsequent request may not need to be considered new for threat detection purposes, although a deduplication system that is looking for an exact matched event may still identify the first event following the change in timing or parameters as a new event, which, for threat detection purposes, may be considered a false positive new event. However, consider another example situation, wherein users make requests that are unlike requests previously made by the users, or are unlike requests recently made by the users. This second situation may be part of a DDoS attack, and the subsequent events would be considered real new events and would require additional scrutiny that the duplicate and near-duplicate events do not require. In this example, the security system is using an approximate duplicate event filter and is therefore able to differentiate between familiar near-duplicate events, such as the slight change from the regularly requesting user, and real new events, such as the DDOS attack requests, in order to reduce the number of new events that need to be scrutinized and focus computer resources on reacting to the actual new events. Also, in some embodiments, an approximate duplicate event filter may be used additionally or alternatively for counting events of a particular type or gathering other statistical information which may be useful for an event analysis service. An approximate duplicate event filter may be used to triage a large stream of event data by focusing an event analysis service on events that are more likely to be new events than other events.

Events that are similar to previous events but are not identical cannot be searched for in a state of event history directly. This may be because a new method of generating the event was used or because a string containing a randomly generated element has been included in the event, neither of which make the event new for the purposes of an event analysis service. Events that vary in these ways (or others) are not likely to be significantly different than previous events but do appear to be new to the system because there is no identical previous event. An approximate duplicate event filter can be used to identify such events that are similar to previous events but are not identical.

An approximate duplicate event filter can identify events by context keys, which may be included in metadata related to the event. In some embodiments, such metadata may be generated for events being processed by the approximate duplicate event filter (or may be included, at least in part, with the events when received by the approximate duplicate event filter). For example, which account of a service generated the event and the primary operation of the event may be included in metadata for an event may further be used as context keys. In some embodiments, the approximate duplicate event filter may use the context keys to shard events for processing and to locate relevant prior events in storage and/or a memory cache for comparison. The approximate duplicate event filter may compare possible new events to prior events that have the same context key as the possible new event. Context keys may be considered part of the events themselves, so an event with a context key that is not in the state of event history may be considered a new event. Context keys may also include information that is not included in an event, such as the time of the event, the location or region of the event, or an entity associated with an event. In some embodiments, all events are associated with information that makes up the context key. As an example, information regarding which entity caused an event may be present for all events. The approximate duplicate event filter may pass new events to another component of the event analysis service for further processing. Similarly, exact duplicate events may be identified and labeled as duplicate events so as to skip analysis by the approximate duplicate event filter.

An approximate duplicate event filter may divide events into token representations in order to compare a possible new event to prior events. Token representations may include sections of strings of an event, and token representations may be generated in various ways. In some embodiments, token representations may be represented as hash values to reduce the resources required for the event analysis service to store a cache comprising the state of event history.

A combination of a token representation and the context key associated with the event of the token representation may be represented as a hash value. The approximate duplicate event filter may search the state of event history for token representations that match the token representations of a possible new event and determine how many token representations of the possible new event have been seen previously seen/stored and how many have not previously been seen/stored. If the ratio of previously seen token representations to not previously seen token representations is sufficiently high, the approximate duplicate event filter may determine the possible new event is an approximate duplicate event. Otherwise, the approximate duplicate event filter may determine the possible new event remains a possible new event. The threshold ratio may be determined by an administrator of the approximate duplicate event filter or a system implementing the approximate duplicate event filter. The approximate duplicate event filter may check the token representations of the possible new event against the token representations of all previously seen individual events stored, for example in cache, for the token representations of previously seen individual events with the same context key, or the token representations of all events with the same context key. After the approximate duplicate event filter has determined whether the possible new event is an approximate duplicate event, the event analysis system may continue to process the event with an appropriate amount of priority. Events may be analyzed prior to analysis by the approximate duplicate event filter, for example to remove exact duplicate events, identifiably new events, and identifiably harmful events from unnecessary extra analysis. In these cases, the event analysis system may be able to sort and address these events without the aid of an approximate duplicate event filter.

FIG. 1 is a block diagram illustrating example components of an approximate duplicate event filter, according to some embodiments.

In some embodiments, an approximate duplicate event filter, such as approximate duplicate event filter 104, may be implemented by an event analysis service, such as event analysis service 102, which may be run on provider network computing recourses 100. Provider network computing resources 100 may include computer systems similar to computer system 800 shown in FIG. 8. The event analysis service 102 may implement a possible new event reporter 114, which may monitor a stream of possible new events to identify events that the approximate duplicate event filter 104 may analyze. Also, the possible new event reporter 114 may send possible new events that have been analyzed by the appropriate duplicate event filter 104 to other analysis components of the event analysis service 102, and may report identified new events. The possible new event reporter 114 is further described in FIG. 4B.

The event analysis service 102 may also implement a state of event history cache 112 to store token representations of prior events that have been seen, so that the approximate duplicate event filter 104 can check the token representations of a possible new event against the stored tokens of already seen events. The state of event history cache 112 is further described in FIG. 5. The event analysis service 102 may also use a state of event history updater 116 to update the state of event history with the generated token representations of possible new events after the approximate duplicate event filter 104 has analyzed the possible new events. Updating the state of event history may include establishing a context key in the state of event history if the context key of the possible new event is not included in the state of event history and associating the token representations with the context key of the possible new event. The state of event history updater 116 may cause individual ones of the prior events in the state of event history to expire, or the state of event history cache 112 itself may expire individual ones of the prior events and the individual ones of the token representations of the prior events. The state of event history updater 116 may expire individual ones of the token representations of prior events from the state of event history while the event analysis service continues to process the possible new event or other possible new events. The state of event history cache 112 may be continuously updated while the possible new event or other possible new events are being analyzed. Expiration of token representations or events from the state of event history cache 112 may be based on time since the token representations or events have been seen by the approximate duplicate event filter or amount of state of event history cache storage. For example, in embodiments, in which the token representations are stored in a cache with a fixed amount of storage capacity, once at full storage capacity, the addition of new token representation may be facilitated by dropping previously stored token representations from the cache. A context key cache may be associated with the state of event history cache 112. The context key cache may update and expire context keys using methods similar to the methods used to update and expire token representations and events from the state of event history cache 112.

An approximate duplicate event filter 104 may use a possible new event identifier 106 to determine how to analyze a particular possible new event. The possible new event identifier is further described in FIG. 3A. An approximate duplicate event filter 104 may use a token representation generator 108 to determine token representations from a possible new event to compare to token representations of prior events. The token representation generator 108 is further described in FIG. 3B. An approximate duplicate event filter 104 may use an approximate duplicate evaluator 110 to compare the token representations of the possible new event to the state of event history cache 112 and determine whether the possible new event is to be considered a new event. The approximate duplicate evaluator 110 is further described in FIG. 4A.

Figure 2:
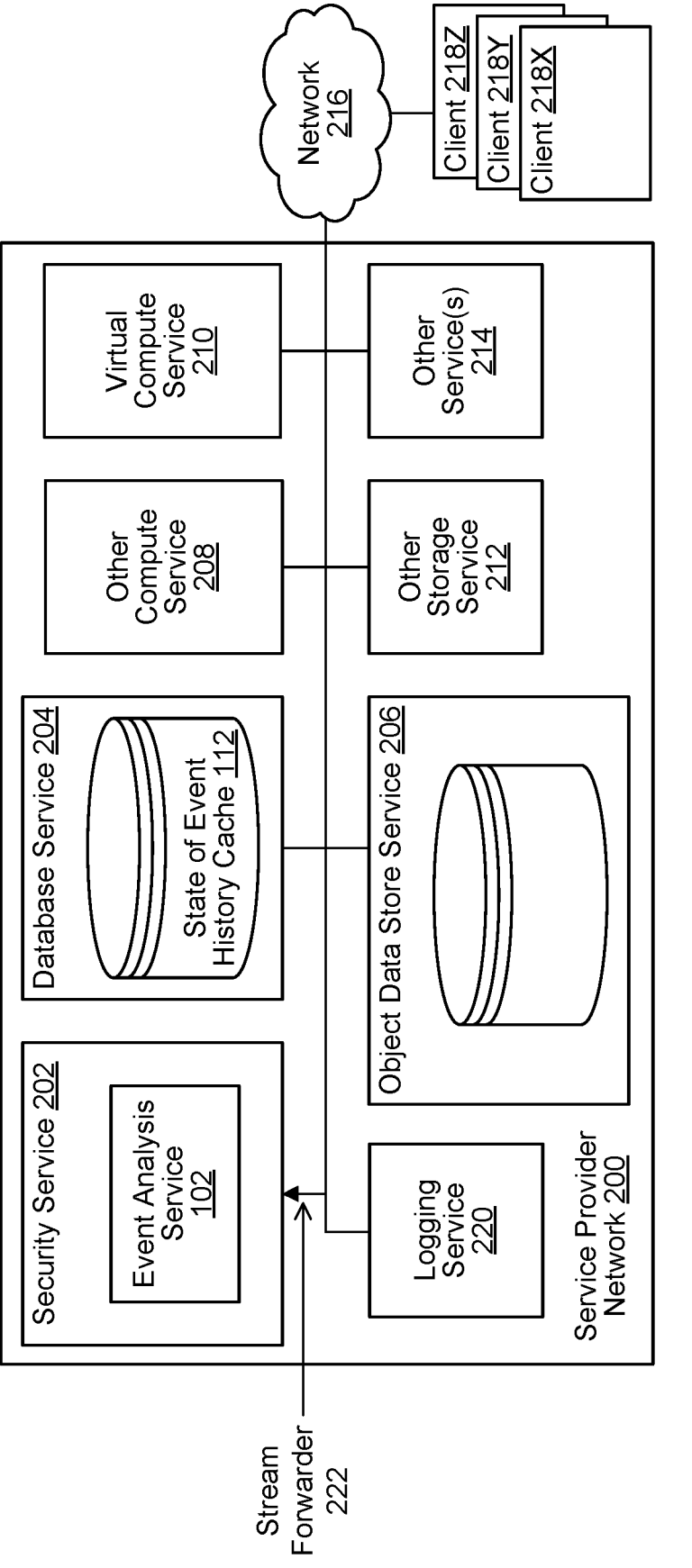
FIG. 2 illustrates a logical architecture of a service provider network as an example of a service that implements an approximate duplicate event filter, according to some embodiments.

FIG. 2 illustrates a logical architecture of a service provider network as an example of a service that implements an approximate duplicate event filter, according to some embodiments.

In the illustrated embodiment, service provider network 200 is connected via network 216 to clients 218X, 218Y, . . . , 218Z. In some embodiments the clients may include respective client networks connecting a plurality of various types of computer resources to the server provider network. Service provider network 200 may include any number of various different types of service provider services, such as but not limited to security service 202, database service 204, other compute service 208, virtual compute service 210, logging service 220, object data store service 206, other storage service 212, and other service(s) 214. These services may be implemented on provider network computing resources 100.

In some embodiments, various aspects of functionality described herein may be implemented by, or with, various ones of the service provider services. For example, functionality associated with the event analysis service 102 may be implemented as part of a security service 202 provided by the service provider network 200. A security service 202 is an example service in which an event analysis service 102 may be used. The security service 202 may be implemented on a virtual compute service 210 and may monitor events occurring within the service provider network 200. In some embodiments, various of the other components illustrated in FIG. 1 may be implemented by various ones of the services of service provider network 200. For example, the state of event history cache 112 might be implemented via the database service 204. Also, computing resources needed to implement the event analysis service 102 may be provided by virtual compute service 210. Logging service 220 may store events to be analyzed by various components of the event analysis service 102, including the approximate duplicate event filter. A stream forwarder 222 may push events from various components of the service provider network 200 to the event analysis service 102.

Additionally, a client application may be built from the various resources provided by the services of service provider network 200 (e.g., via the other compute service 208 and the other storage service 212) and the client application may service as a source of events that are evaluated by the event analysis service 102 and the approximate duplicate event filter, as described herein.

Figure 3A:
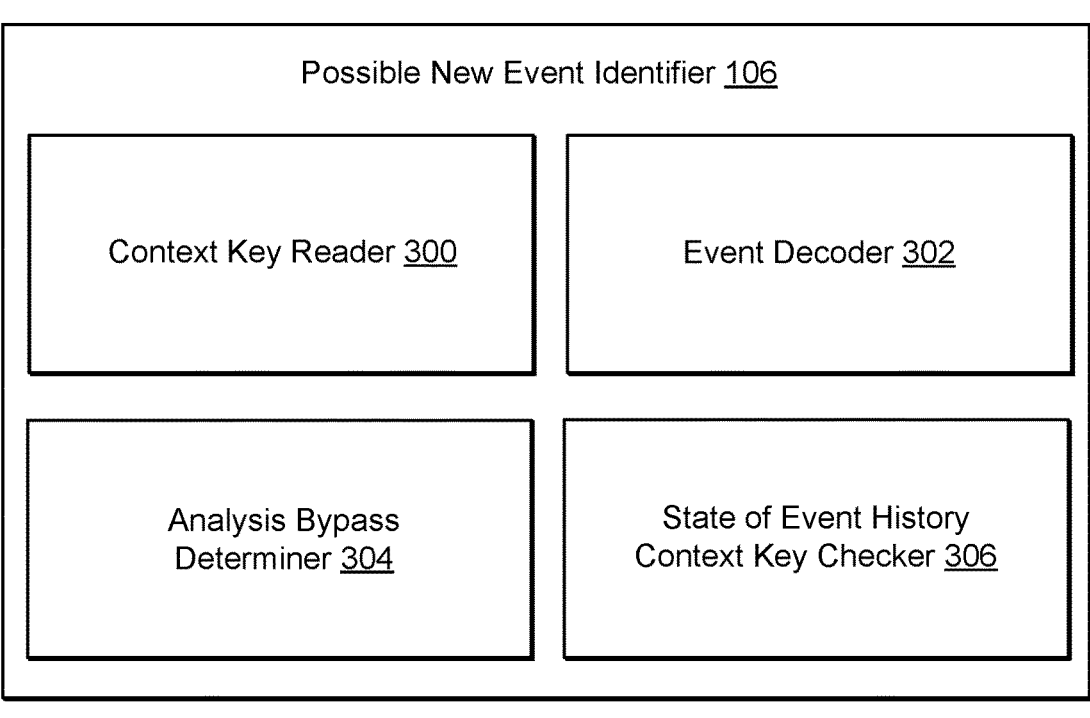
FIG. 3A illustrates a block diagram of example components of a possible new event identifier, according to some embodiments.

FIG. 3A illustrates a block diagram of example components of a possible new event identifier, according to some embodiments.

In some embodiments, components of a possible new event identifier 106 include a context key reader 300, an event decoder 302, an analysis bypass determiner 304, and a state of event history context key checker 306. The context key reader 300 may locate information that is in the possible new event or associated with the possible new event, wherein the located information can be used as a context key for the possible new event. In some embodiments, context keys may be assembled by the context key reader 300 from fields of the possible new event. An event decoder 302 may identify potential context key portions of an event and potentially analyzable portions of an event. The event decoder 302 may provide the possible context keys and possibly analyzable portions of a possible new event to other components of the approximate duplicate event filter.

Context keys may included in, or generated from, metadata associated with the event. A context key may include information such as where the event originated, possibly including the account, user, and computer which originated the event, and a context key may include what kind of event it is, possibly including the type of operation the event performs and the initial pathway of the event. Other information about the event may be included in the context key, such as the geographic region that the event was originated in. Possible new events with a context key that is not in the state of event history may be identified as new events that require additional scrutiny, so information included in the context key may be information that is especially relevant to whether an event is new or not. In some embodiments, the context key may include a field that can be intentionally varied on events that are intended to bypass the approximate duplicate event filter and be analyzed by another portion of the event analysis system, such as for a test of that other portion. Also, events may be intentionally varied such that the varied events are intended to be identified as new events for other system analysis purposes.

The state of event history context key checker 306 may search the state of event history or the context key cache for the context key in whole form or for the context key represented as token representations. The state of event history context key checker 306 may search the state of event history or the context key cache for the context key represented as hash values of either a whole form of the context key or token representations of the context key. If the state of event history context key checker 306 does not find the context key in the state of event history or the context key cache, the analysis bypass determiner 304 may decide that the possible new event is a new event and provide it to the possible new event reporter 114. An event with a context key that is not in the state of event history will not have an approximate duplicate event with the same context key in the state of event history, so there is no need for the approximate duplicate event filter to check for one, although the approximate duplicate event filter may update its cache storing the state of event history with the event and its context key. If the state of event history context key checker 306 does find the context key, it may provide this information to the approximate duplicate evaluator 110 for further analysis.

Figure 3B:
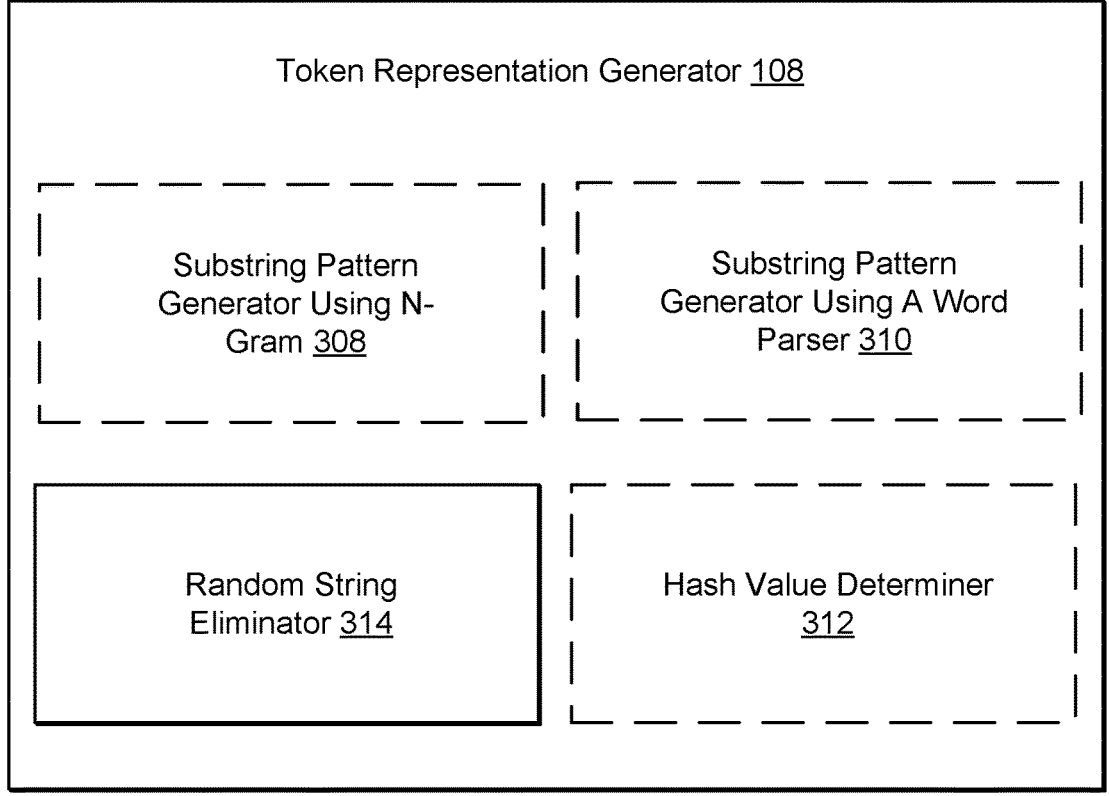
FIG. 3B illustrates a block diagram of example components of a token representation generator, according to some embodiments.

FIG. 3B illustrates a block diagram of example components of a token representation generator, according to some embodiments.

In some embodiments, components of a token representation generator 108 include a substring pattern generator using a word parse 310 or a substring pattern generator using n-gram 308, a random string eliminator 314, and a hash value determiner 312. The token representation generator 108 may generate token representations of particular predetermined fields of an event or the token representation generator 108 may generate token representations of the event as a whole. The token representation generator 108 may generate token representations of the context key of the event or the token representation generator 108 may exclude fields that were used in identifying the context key of the event from token representation generation. If elements used to create the context key are also used in token representation generation, the ratio used to analyze the possible new events may need to be higher than the desired ratio if elements used to create the context key are not used in token representation generation.

A random string eliminator 314 may detect known sources of variation, for example, unique labels that are assigned to a particular type of event which are identifiable because of their length and structure. Examples of known random strings are strings of randomly generated hexadecimal over twelve characters long that may be known to be regularly added to particular types of events by a particular service provider service, and sets of numeral strings between eight and seventeen digits long that are routinely placed in known locations of events by a particular service provider service. These random strings may have some meaning or significance in the context of a particular possible new event, but may be essentially single use strings and may be unlikely to be helpful in identifying new events as opposed to near-duplicate events. As an example, an international standard book number (ISBN) of a purchased book may not be helpful in determining whether it is usual for a particular account to purchase a book, so ISBNs may be deemed to be random strings and screened out by the random string eliminator 314. A non-random string that a random string eliminator 314 does not look for is something that is not likely to be single use and may be helpful in identifying a new event that does require scrutiny. For example, the address that a book is to be sent to may indicate a new event that requires scrutiny if the address is different from previously used addresses, so the address is not a random string and a random string eliminator 314 would not screen the address out. A random string eliminator 314 may check for only known sources of irrelevant strings which may falsely increase the number of token representations that are determined to be not included in the state of event history for a particular possible new event. Examples of known random strings include cryptographic elements, unique identifiers, and randomized file names. Checking for only known sources of randomness may reduce the likelihood of excluding information that would indicate newness for a possible new event. Prior to token representation generation, a random string eliminator 314 may determine a substring is random and may remove the substring from the event or may replace the substring with a static substring. The static substring may indicate the type of determined random substring that was replaced.

Substring patterns are a possible type of token representation, and may be determined by using a word parser to identify particular portions of an event string, or by using n-grams, which may be portions of an event string. In some embodiments, both a word parser and an n-gram generator may be used in combination to generate substring patterns. Substring patterns identified by a word parser may be substrings that are particularly relevant to the event, and therefore contribute to a determination of its newness. N-grams, for example a 3-gram, a 4-gram, or a 5-gram, are the n-character portions of a string. For example, the word "computer" can be represented as the following set of 3-grams: "com" "omp" "mpu" "put" "ute" and "ter", which are the 3-character portions of the string that make up the word. N-grams may include spaces and symbols that are included in strings of an event. Some embodiments may first identify substring patterns using a word parser and then generate n-gram substring patterns of the identified substring patterns. In some embodiments, token representations may be generated by a language model or other machine learning model. In some embodiments, the token representations may be hash values of the possible new event or portions of the possible new event. A hash value determiner 312 may be used to compress substring patterns or other token representations into hash values, so that the token representations may be compared and stored in hash value form, which may require fewer computing resources than comparing and storing token representations in a full string form. In some embodiments, hash value determination is done as part of event evaluation. Changing the type of token representation that is used in an approximate duplicate event filter may require that the state of event history be emptied because the new type of token representations may not be compatible with the prior type of token representations, and comparison would generate incorrect results.

Figure 4A:
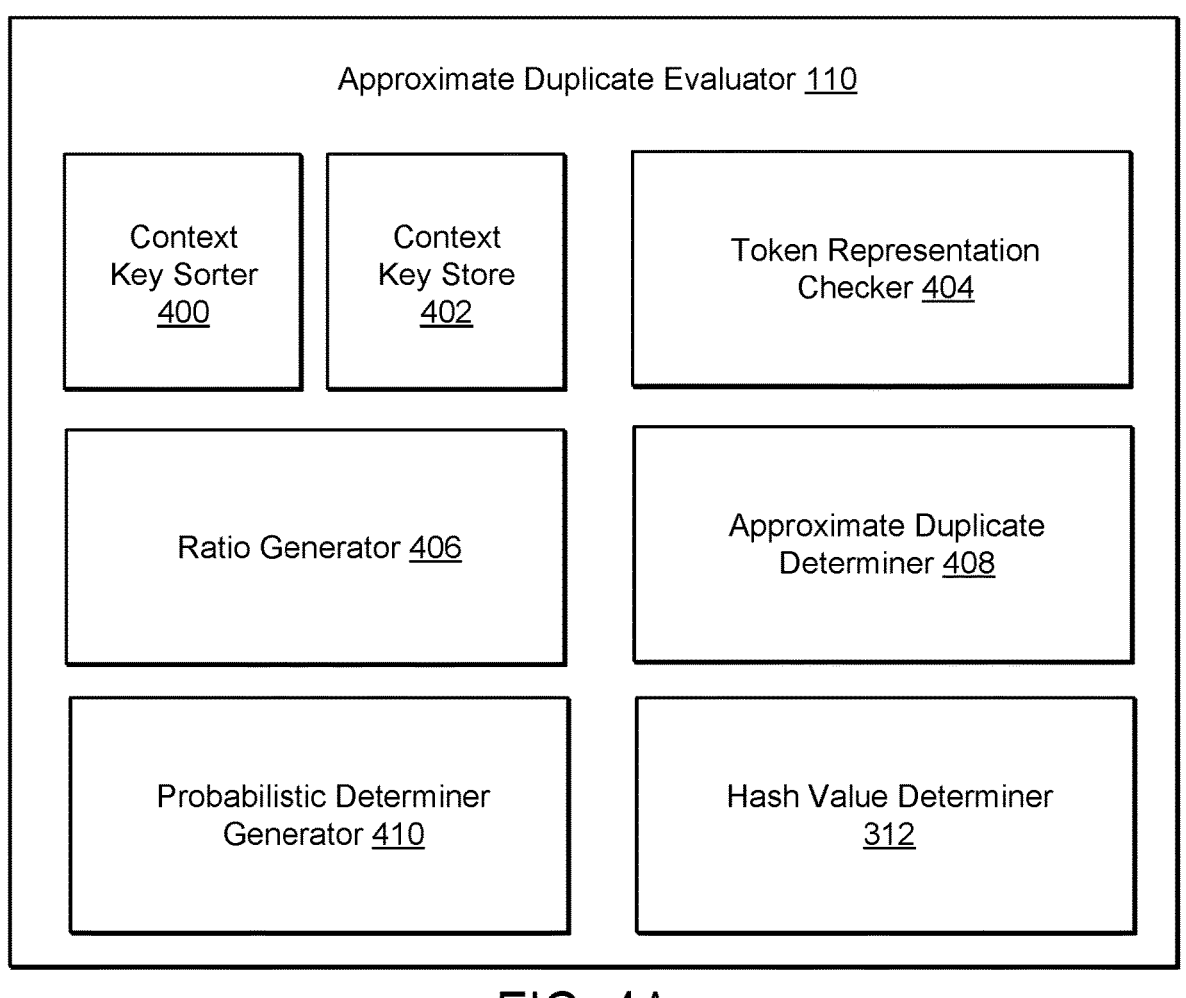
FIG. 4A illustrates a block diagram of example components of an approximate duplicate evaluator, according to some embodiments.

FIG. 4A illustrates a block diagram of example components of an approximate duplicate evaluator, according to some embodiments.

An approximate duplicate evaluator 110 may analyze possible new events that have particular context keys, and the approximate duplicate evaluator 110 may be provided events with those context keys by the possible new event identifier 106. An approximate duplicate evaluator may sort context keys of possible new events using a context key sorter 400 in combination with a context key store 402 in order to determine which physical hardware processor should analyze a possible new event, and in order to determine which set of token representations in the state of event history should be used to analyze a possible new event. A context key store may be a context key cache such as context key cache 514 shown in FIG. 5B. Sharding the analysis of possible new events by the context key may prevent computer resources from becoming overwhelmed or backlogged. The memory or cache storing the state of event history may also be sharded according to context keys, and the individual processor that analyzes a possible new event with a particular context key may be physically near or integrated with hardware that stores the state of event history cache for the particular context key. The sharding and integration according to the context key may improve the speed of operation of the approximate duplicate event filter.

A token representation checker 404 may check the token representations of a possible new event against the token representations stored in event history. The token representation checker 404 may check the token representations against the global state of event history or the state of event history for the context key of a possible new event. The token representation checker 404 may check the token representations of the possible new event against all token representations in the state of event history or may check the token representations of the possible new event against the token representations of other individual events in the state of event history. The token representation checker 404 may use hash structures such as a bloom filter or cuckoo table to check whether individual token representations are present in the state of event history. A hash value determiner 312 may determine the hash values of token representations, context keys, and the combination of token representations and context keys that the token representation checker may use. The token representation checker 404 may return an approximate or probable answer of whether a token representation is included in the state of event history.

A ratio generator 406 may use the results of a token representation checker 404 to generate a ratio of the number of token representations of the possible new event that were identified in the state of event history to the number of tokens that were not identified in the state of event history, or the ratio may be the number of token representations of the possible new event that were identified in the state of event history to the total number of token representations in the possible new event. These ratios include the ratios which are necessarily able to be determined along with these ratios, such as the ratio of the number of tokens that were not identified in the state of event history to the number of token representations of the possible new event that were identified in the state of event history and the ratio of the number of token representations of the possible new event that were not identified in the state of event history to the total number of token representations in the possible new event. A Jaccard distance is the ratio of the number of token representations of the possible new event that were identified in the state of event history to the total number of token representations in the possible new event. The ratio generated by a ratio generator 406 may be used in combination with another value generated by a probabilistic determiner generator 410. In some embodiments, the ratio may be a probabilistic determiner.

A probabilistic determiner generator 410 may generate a probabilistic determiner, which may be a score or other value related to the likelihood a possible new event is a new event or an approximate duplicate event. The probabilistic determiner may be based on a weight of token representations, for example, token representations associated with previously identified events of interest may have a higher weight than token representations not associated with known events of interest. Frequency of occurrence of token representations in the state of event history may affect the weight of token representations. For example, high frequency token representations may have a lower weight than low frequency token representations, meaning that a common token may have less effect on the weight score than a relatively rarer token. A count of occurrences of token representations in the state of event history may affect the weight of token representations. For example, a count of occurrences may be used to determine frequency, or the count may be used to determine the weight directly. Frequency may be a known or set value that does not entirely depend on count, for example a particular token representation that is known to occur in most events may have an artificially set frequency. Token representations that have been seen more recently may be considered to have a higher frequency than token representations with the same or similar count that have not been seen as recently. Depending on the method of calculating a probabilistic determiner that is used, either a high weight or a low weight relative to a threshold, which may be affected by a ratio generated by a ratio generator 406, may indicate newness or lack of newness of an event.

An approximate duplicate determiner 408 may analyze the ratio that was generated by the ratio generator 406, another probabilistic determiner that was generated by the probabilistic determiner generator 410, or a combination of the ratio and another probabilistic determiner. The approximate duplicate determiner may determine whether the ratio or other probabilistic determiner exceeds a threshold for identifying approximate duplicate events. The approximate duplicate determiner 408 may determine that a possible new event is a possible new event if the ratio or other probabilistic determiner meets or exceeds a threshold, or is a near-duplicate event if the ratio is below a threshold. The approximate duplicate determiner 408 may make the opposite determination if the ratio or other probabilistic determiner meets the threshold exactly. Depending on the form of the ratio or other probabilistic determiner that the approximate duplicate event filter used, the approximate duplicate determiner 408 may determine a possible new event is a near-duplicate event if the ratio or other probabilistic determiner is above a threshold, for example if the ratio used is the inverse ratio to the Jaccard distance, the ratio of the number of token representations of the possible new event that were not identified in the state of event history to the total number of token representations in the possible new event. The threshold value may be pre-determined and may be adjustable by a manager of the event analysis system. The threshold value for the probabilistic determiner may be adjusted based on other determinations, for example if a Jaccard distance ratio above a particular value is found, the threshold for a weight-based probabilistic determiner may be set to a lower value. The threshold value may be represented by a ratio (e.g., 7:10), a number out of 1 (e.g., 0.7), a fraction (e.g., 7/10), a percentage (e.g., 70%) or another form. The approximate duplicate determiner 408 may provide the result of its analysis, which may include the ratio or other probabilistic determiner for possible reevaluations in addition to a binary duplicate/new determination or an indication of whether the ratio is above, below, or equal to the current threshold, to a possible new event reporter 114. The approximate duplicate determiner 408 may also use the probabilistic determiner to sort events based on the likelihood the possible new event is a new event. The approximate duplicate determiner 408 may sort the events directly or may provide a value which another component of an event analysis system may use to sort the possible new events based on likelihood of newness.

Figure 4B:
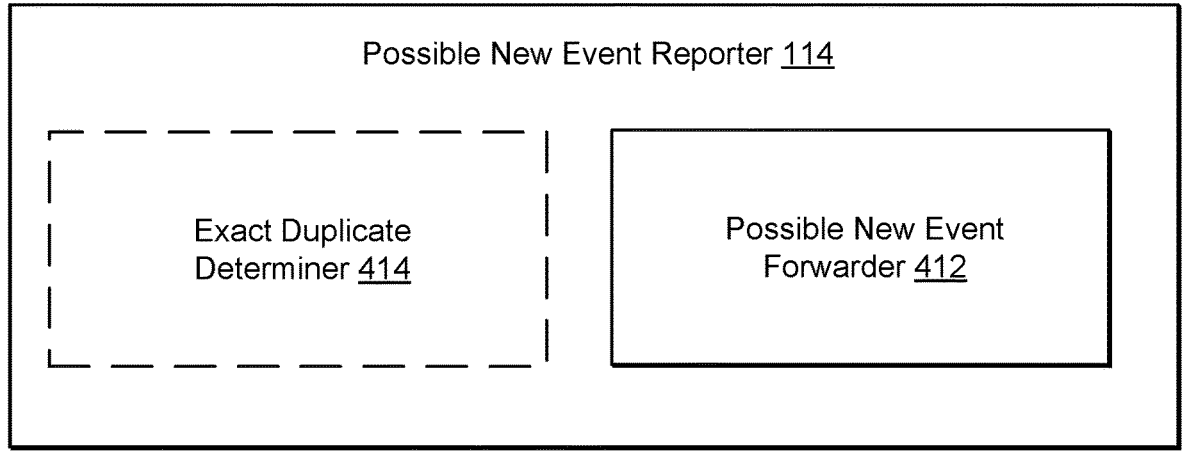
FIG. 4B illustrates a block diagram of example components of a possible new event reporter, according to some embodiments.

FIG. 4B illustrates a block diagram of example components of a possible new event reporter, according to some embodiments.

A possible new event reporter 114 may manage a stream of incoming possible new events. The possible new event reporter 114 may use an exact duplicate determiner 414 to identify and filter exact duplicate events before allowing them to reach an approximate duplicate event filter 104. This may reduce computing resources used by the approximate duplicate event filter. The exact duplicate determiner 414 may determine that a possible new event is included in the state of event history and may label the possible new event as a duplicate event in order to avoid or lessen further analysis of the duplicate event. The exact duplicate determiner 414 may also update the state of event history cache with the new time and order the duplicate event was seen so that the event does not expire unduly early. The possible new event reporter 114 may receive the results of analysis from the approximate duplicate event filter 104 and route possible new events to an appropriate additional analyzer within the event analysis service 102 or output a notification of a new event. A possible new event forwarder 412 may receive incoming possible new events from other components of an event analysis system or from a stream forwarder 222 and may direct the possible new events to the appropriate components of the approximate duplicate event filter or other component of the event analysis system. A possible new event forwarder may send events analyzed by the approximate duplicate event filter to the appropriate component of the event analysis system according to the status determination made by the approximate duplicate event filter.

Figure 5A:
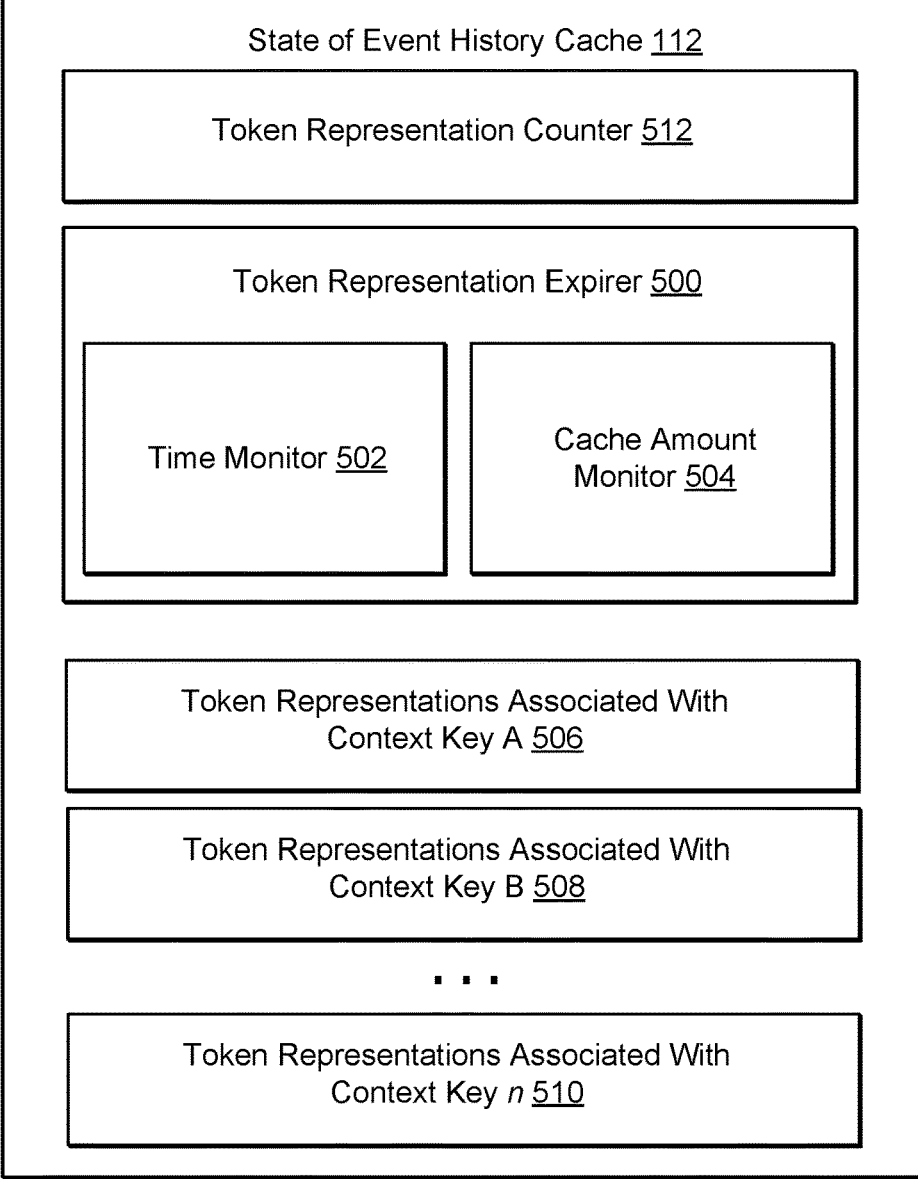
FIG. 5A illustrates a block diagram of example components of a state of event history cache, according to some embodiments.

FIG. 5A illustrates a block diagram of example components of a state of event history cache, according to some embodiments.

The state of event history cache 112 may store token representations of prior events according to the context key they are associated with, for example, token representations associated with context key A 506, token representations associated with context key B 508, and token representations associated with context key n 510. The exact number of context keys in the state of event history may depend on actual occurrence of events with varied context keys, and expiration of events and token representations. Context keys may expire from the state of event history cache 112, the context key cache 514, or both when all token representations associated with a given context key are expired. Token representations may also be stored according to the individual event they are associated with, for example a set of token representations stored in the group of token representations associated with context key A 506 may be associated with each other as a set because the set of token representations came from the same individual prior event. Token representations may also be stored without regard to event or context key, and checking the state of event history according to the context key may be performed by checking for a hash value which is a combination of a token representation and a context key. A token representation counter 512 may track how many of a particular token representation has been seen, or how many of the particular token representation has been seen recently. The count tracked by a token representation counter 512 may be used to calculate a probabilistic determiner.

The state of event history cache 112 may use a token representation expirer 500 to cause individual token representations or sets of token representations associated with an event to expire. The token representation expirer 500 may use a time monitor 502 to expire individual token representations because a threshold length of time has elapsed since the individual token representations were included in the state of event history or updated based on a more recent occurrence. In some embodiments, new token representations are included in the state of event history regardless of duplication and token representations may be maintained until they are expired rather than being updated upon reoccurrence. The token representation expirer 500 may use a cache amount monitor 504 to expire the least recently updated individual token representations or set of token representations associated with an event in order to maintain available storage space for incoming events to be updated to the state of event history cache 112. A state of event history updater including new token representations in the state of event history cache 112 may cause the least recently seen token representations to expire. The token representation expirer 500 may expire token representations for other reasons, such as a determination that an event that was updated to the state of event history cache 112 should be identified and analyzed as a new event in the future. This determination may be made by another portion of the event analysis service or a manager of the event analysis service.

Figure 5B:
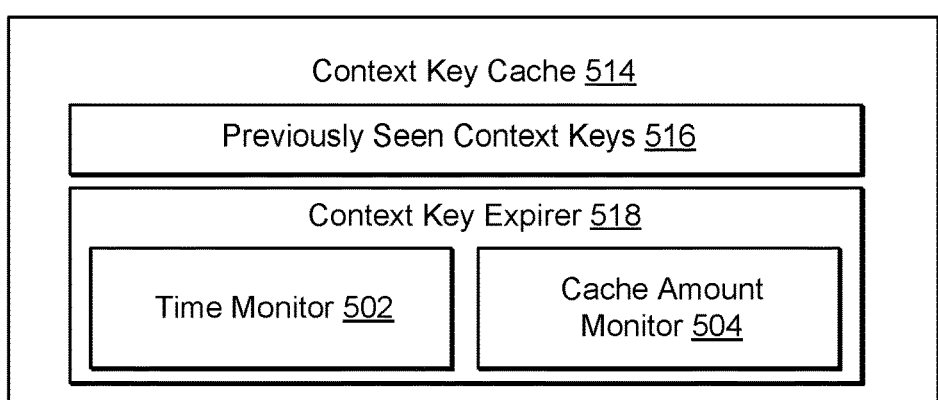
FIG. 5B illustrates a block diagram of example components of a context key cache, according to some embodiments.

FIG. 5B illustrates a block diagram of example components of a context key cache, according to some embodiments.

A context key cache 514 may store the context keys separately from the token representations. Previously seen context keys 516 may be used by an analysis bypass determiner 304 as shown in FIG. 3 to determine whether a possible new event should be analyzed by the approximate duplicate event filter or should be forwarded to another component of the event analysis service as a possible new event without analysis. Storing a cache of the context keys alone may allow the analysis bypass determiner to quickly decide whether a context key has been seen before or has been seen recently. A context key expirer 516 may remove context keys from the context key cache 514 similarly to how token representations may be removed from a state of event history cache. Context keys may also be removed from the context key cache if the state of event history cache determines there is no stored token representation associated with that context key.

FIG. 6 is a flowchart illustrating a method of using an approximate duplicate event filter, according to some embodiments.

At 600, an approximate duplicate event filter, such as approximate duplicate event filter 104, identifies a possible new event based on a context key of the possible new event. A context key may include information such as where the event originated, possibly including the account, user, and computer which originated the event, and a context key may include what kind of event it is, possibly including the type of operation the event performs and the initial pathway of the event. At 602, an approximate duplicate event filter generates a set of token representations of the possible new event. At 604, an approximate duplicate event filter evaluates the set of the token representations of the possible new event. This step may be performed by generating a ratio of a number of the token representations of the possible new event that are included in the state of event history and associated with the context key of the possible new event to a number of the token representations of the possible new event that are distinct from the token representations of the state of event history associated with the context key of the possible new event or to a number of the token representations of the possible new event. The evaluation may be limited to a recent time period, for example the time period may be the length of time which is used to determine when token representations are expired from the state of event history. At 606, an approximate duplicate event filter determines that the possible new event is not an approximate duplicate of one or more of the prior events based on the probabilistic determiner being below a threshold for approximate new events. The probabilistic determiner may be a ratio such as the Jaccard distance or another probabilistic determiner such as a weight-based score. The probabilistic determiner may be a combination of values which could individually be probabilistic determiners. At 608, output the possible new event. At 610, an approximate duplicate event filter updates the state of event history to include the token representations of the possible new event. Performing step 610 after step 604 avoids identifying the possible new event as a duplicate of itself.

FIG. 7A is a flowchart illustrating a method of using a context key to skip analysis by an approximate duplicate event filter, according to some embodiments.

At 600, an approximate duplicate event filter, or other component of an event analysis system, identifies a possible new event based on a context key of the possible new event. At 700, an approximate duplicate event filter, or other component of an event analysis system, determines the context key of the possible new event is not included in the state of event history. At 702, an approximate duplicate event filter, or other component of an event analysis system, outputs the possible new event. Following step 702, the possible new event may be further analyzed by other portions of the event analysis system.

FIG. 7B is a flowchart illustrating a method of identifying an exact duplicate event to skip analysis by an approximate duplicate event filter, according to some embodiments.

At 704, an approximate duplicate event filter, or other component of an event analysis system, determines a second possible new event is included in the state of event history. At 706, an approximate duplicate event filter, or other component of an event analysis system, labels the second possible next event as a duplicate event. Following step 706, the second possible new event may be assigned an analysis priority appropriate for a duplicate event, or the second possible new event may be filtered out of the event analysis system as a known and recurring event that does not require analysis. A second possible new event may be a possible new event.

FIG. 7C is a flowchart illustrating a method of avoiding known sources of randomness while using an approximate duplicate event filter, according to some embodiments.

At 708, an approximate duplicate event filter removes or replaces strings in the possible new event that are determined to be random strings. At 602, an approximate duplicate event filter generates a set of token representations of the possible new event. Performing step 708 prior to step 602 may ensure that known random strings are not mistakenly included in the event's token representations, which could cause the event to appear more likely to be a new event than is warranted. Whether the random strings are eliminated or replaced with a static string, the event should no longer falsely appear to be new due to the known random strings.

FIG. 7D is a flowchart illustrating methods of generating a set of token representations of a possible new event, according to some embodiments.

At 602, an approximate duplicate event filter generates a set of token representations of the possible new event. This step may be performed by performing one of steps 710, 712, or a combination of steps 710 and 712. At 710, an approximate duplicate event filter identifies grammatical components of a string included in the possible new event using a word parser. At 712, an approximate duplicate event filter generates a set of fixed length substring patterns of a string included in the possible new event.

FIG. 7E is a flowchart illustrating methods of evaluating the set of token representations of the possible new event, according to some embodiments.

At 604, an approximate duplicate event filter evaluates the set of the token representations of the possible new event. This step may be performed by performing one of steps 714, 716, or a combination of steps 714 and 716. At 714, an approximate duplicate event filter generates a ratio of a number of the token representations if the possible new event that are included in the state of event history and associated with the context key of the possible new event to a number of the token representations of the possible new event. This ratio may be a Jaccard distance. At step 716, an approximate duplicate event filter generates a probabilistic determination of a duplicate event based on a number of token representations of the possible new event that are included in the state of event history. The probabilistic determination may be a ratio such as a Jaccard distance, a weight-based score, or some other value determined based on the number of token representations of the possible new event that are included in the state of event history.

Example Computer System

Figure 8:
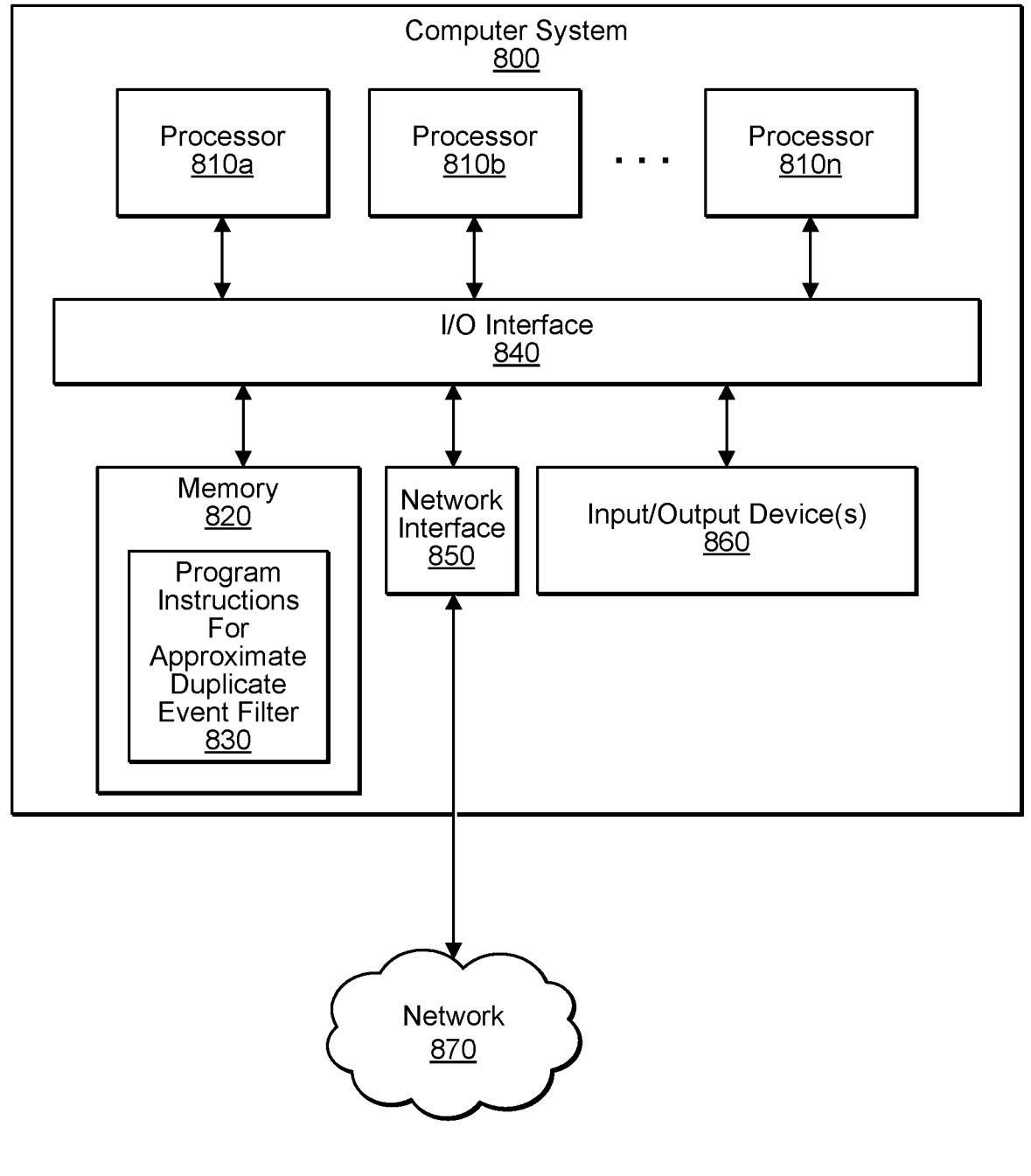
FIG. 8 is a block diagram illustrating an example computer system that implements some or all of the techniques described herein, according to some embodiments.

FIG. 8 is a block diagram illustrating an example computer system that implements some or all of the techniques described herein, according to some embodiments.

FIG. 8 illustrates exemplary computer system 800 usable to implement the approximate duplicate event filter as described above with reference to FIGS. 1-7. In different embodiments, computer system 800 may be any of various types of devices, including, but not limited to, a network computer, a mobile device, a consumer device, application server, storage device, a peripheral device such as a switch, modem, router, or in general any type of computing or electronic device.

Various embodiments of program instructions for an approximate duplicate event filter, as described herein, may be executed in one or more computer systems 800, which may interact with various other devices. Note that any component, action, or functionality described above with respect to FIGS. 1-7 may be implemented on one or more computers configured as computer system 800 of FIG. 8, according to various embodiments. In the illustrated embodiment, computer system 800 includes one or more processors 810 coupled to a system memory 820 via an input/output (I/O) interface 840. Computer system 800 further includes a network interface 850 coupled to I/O interface 840, and one or more input/output devices 860. In some cases, it is contemplated that embodiments may be implemented using a single instance of computer system 800, while in other embodiments multiple such computer systems, or multiple nodes making up computer system 800, may be configured to host different portions or instances program instructions as described above for various embodiments. For example, in one embodiment some elements of the program instructions may be implemented via one or more nodes of computer system 800 that are distinct from those nodes implementing other elements.

In some embodiments, computer system 800 may be implemented as a system on a chip (SoC). For example, in some embodiments, processors 810, memory 820, I/O interface 840 (e.g., a fabric), etc. may be implemented in a single SoC comprising multiple components integrated into a single chip. For example, a SoC may include multiple CPU cores, a multi-core GPU, a multi-core neural engine, cache, one or more memories, etc. integrated into a single chip. In some embodiments, an SoC embodiment may implement a reduced instruction set computing (RISC) architecture, or any other suitable architecture.

System memory 820 may be configured to store compression or decompression program instructions for an approximate duplicate event filter 830 accessible by one or more of the processors 810. In various embodiments, system memory 820 may be implemented using any suitable memory technology, such as static random-access memory (SRAM), synchronous dynamic RAM (SDRAM), nonvolatile/Flash-type memory, or any other type of memory. In the illustrated embodiment, program instructions for an approximate duplicate event filter 830 may be configured to implement any of the functionality described above. In some embodiments, program instructions and/or data may be received, sent or stored upon different types of computer-accessible media or on similar media separate from system memory 820 or computer system 800.

In one embodiment, I/O interface 840 may be configured to coordinate I/O traffic between processor 810, system memory 820, and any peripheral devices in the device, including network interface 850 or other peripheral interfaces, such as input/output devices 860. In some embodiments, I/O interface 840 may perform any necessary protocol, timing or other data transformations to convert data signals from one component (e.g., system memory 820) into a format suitable for use by another component (e.g., processor 810). In some embodiments, I/O interface 840 may include support for devices attached through various types of peripheral buses, such as a variant of the Peripheral Component Interconnect (PCI) bus standard or the Universal Serial Bus (USB) standard, for example. In some embodiments, the function of I/O interface 840 may be split into two or more separate components, such as a north bridge and a south bridge, for example. Also, in some embodiments, some or all of the functionality of I/O interface 840, such as an interface to system memory 820, may be incorporated directly into processor 810.

Network interface 850 may be configured to allow data to be exchanged between computer system 800 and other devices attached to a network 870 (e.g., carrier or agent devices) or between nodes of computer system 800. Network 870 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 850 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 860 may, in some embodiments, include one or more display terminals, keyboards, keypads, touchpads, scanning devices, voice or optical recognition devices, or any other devices suitable for entering or accessing data by one or more computer systems 800. Multiple input/output devices 860 may be present in computer system 800 or may be distributed on various nodes of computer system 800. In some embodiments, similar input/output devices may be separate from computer system 800 and may interact with one or more nodes of computer system 800 through a wired or wireless connection, such as over network interface 850.

As shown in FIG. 8, memory 820 may include program instructions for an approximate duplicate event filter 830, which may be processor-executable to implement any element or action described above. In one embodiment, the program instructions may implement the methods described above. In other embodiments, different elements and data may be included.

Computer system 800 may also be connected to other devices that are not illustrated, or instead may operate as a stand-alone system. In addition, the functionality provided by the illustrated components may in some embodiments, be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising, one or more processors;

one or more memory storing program instructions for implementing an event-deduplication engine for an event analysis service; and one or more storage devices configured to implement a cache that stores a state of event history for events processed by the event analysis service, wherein the state of event history comprises token representations of prior events, wherein the token representations are associated with context keys;

wherein the program instructions, when executed on or across the one or more processors, cause the one or more processors to:

identify a possible new event based on a context key of the possible new event;

generate a set of token representations of the possible new event;

evaluate the set of the token representations of the possible new event, wherein evaluation of the set of the token representations of the possible new event comprises generating a ratio of a number of the token representations of the possible new event that are included in the state of event history and associated with the context key of the possible new event to a number of the token representations of the possible new event;

determine, based on the evaluation of the set of the token representations of the possible new event, whether the possible new event is an approximate duplicate of one or more of the prior events based on the ratio being above a threshold for identifying approximate duplicates;

output, based on a determination that the possible new event is not an approximate duplicate of a recent prior event, the possible new event; and update the state of event history to include the set of the token representations of the possible new event.

2. The system of claim 1, wherein to generate the set of the token representations of the possible new event, the program instructions further cause the one or more processors to:

identify grammatical components of a string included in the possible new event with a word parser; or generate a set of fixed length substring patterns.

3. The system of claim 1, wherein to generate the set of the token representations of the possible new event, the program instructions further cause the one or more processors to:

generate hash values for the token representations, wherein the stored token representations of the prior event are stored as hash values; and wherein to update the state of event history to include the set of the token representations of the possible new event the program instructions further cause the one or more processors to:

store the generated hash values for the token representations in the cache storing the state of event history.

4. The system of claim 1, wherein the program instructions, when executed on or across the one or more processors, further cause the one or more processors to:

determine whether the context key of the possible new event is associated with a context key stored in a context key history; and output the possible new event, based on a determination that the context key of the possible new event is not associated with a context key stored in the context key history.

5. The system of claim 1, wherein the one or more processors are a plurality of processors and wherein the program instructions, when executed on or across the plurality of processors, cause the plurality of processors to:

determine whether the context key of the possible new event is included in the context keys associated with the token representations of the state of event history; and perform said evaluation of the set of the token representations of the possible new event on a processor of the plurality of processors designated for the context key of the possible new event, wherein the processor has access to the stored token representations of the state of event history associated with the context key of the possible new event.

6. The system of claim 1, wherein to update the state of event history to include the set of the token representations of the possible new event, the program instructions, when executed on or across the one or more processors, further cause the one or more processors to expire individual ones of the token representations of the prior events from the state of event history while the event analysis service continues to process the possible new event or other possible new events.

7. A method, comprising, identifying a possible new event based on a context key of the possible new event;

generating a set of token representations of the possible new event;

evaluating the set of the token representations of the possible new event, wherein evaluation of the token representations of the possible new event comprises generating a probabilistic determination of a duplicate event based on a number of token representations of the possible new event that are included in a state of event history for events processed by an event analysis service, wherein the state of event history comprises a set of token representations of prior events;

determining, based on the evaluation of the token representations of the possible new event, that the possible new event is not an approximate duplicate of one or more of the prior events based on the probabilistic determination of a duplicate event and a threshold for approximate new events;

outputting, based on a determination that the possible new event is not an approximate duplicate of a recent prior event, the possible new event; and updating the state of event history to include the token representations of the possible new event.

8. The method of claim 7, further comprising:

determining the context key of the possible new event is not included in the state of event history, wherein the state of event history comprises a set of context keys of the prior events; and outputting, based on a determination that the context key of the possible new event is not included in the state of event history, the possible new event.

9. The method of claim 7, further comprising:

determining a second possible new event is included in the state of event history; and labeling, based on a determination that the second possible new event is included in the state of event history, the second possible new event as a duplicate event.

10. The method of claim 7, wherein updating the state of event history to include the token representations of the possible new event comprises expiring individual ones of the token representations of prior events from the state of event history while the event analysis service continues to process the possible new event or other possible new events.

11. The method of claim 10, wherein said expiring individual ones of the token representations of prior events from the state of event history is performed based on an amount of available storage for the state of event history.

12. The method of claim 8, wherein updating the state of event history to include the token representations of the possible new event comprises expiring one or more of the token representations of prior events from the state of event history based on a time since the one or more token representations of the prior events were included in the state of event history.

13. The method of claim 7, wherein the state of event history comprises the set of token representations of prior events, wherein the set of token representations comprises a combination of a context key of an individual one of a prior event and an individual one of a token representation of the individual one of the prior event, represented as a hash value.

14. The method of claim 7, wherein the probabilistic determination is a Jaccard distance.

15. The method of claim 7, wherein the probabilistic determination is a score generated based on a weight assigned to individual ones of the token representations of the possible new event.

16. The method of claim 15, wherein the weight is based on a frequency of occurrence within the state of event history of individual ones of the token representations of the possible new event.

17. The method of claim 15, wherein the weight is based on a count of occurrence within the state of event history of individual ones of the token representations of the possible new event.

18. The method of claim 7, further comprising removing or replacing strings in the possible new event that are determined to be random strings before said generating a set of token representations of the possible new event.

19. A non-transitory computer-readable storage medium storing program instructions that, when executed on or across one or more processors, cause the one or more processors to:

identify a possible new event based on a context key of the possible new event;

generate a set of token representations of the possible new event;

evaluate the set of the token representations of the possible new event, wherein evaluation of the token representations of the possible new event comprises generating a probabilistic determination based on a number of token representations of the possible new event that are included in a state of event history for events processed by an event analysis service, wherein the state of event history comprises a set of token representations of prior events;

determine, based on the evaluation of the token representations of the possible new event, whether the possible new event is an approximate duplicate of one or more of the prior events, based on the probabilistic determination;

output, based on a determination that the possible new event is not an approximate duplicate of a recent prior event, the possible new event; and update the state of event history to include the token representations of the possible new event.

20. The computer-readable storage medium of claim 19, wherein the probabilistic determination is:

a ratio of a number of the token representations of the possible new event that are included in the state of event history and associated with the context key of the possible new event to a number of the token representations of the possible new event; or a score generated based on a weight assigned to individual ones of the token representations of the possible new event.

* * * * *